United States Patent [19]
Weyer

[11] Patent Number: 6,024,572
[45] Date of Patent: Feb. 15, 2000

[54] MEANS FOR ADDING EDUCATIONAL ENHANCEMENTS TO COMPUTER GAMES

[76] Inventor: Frank M. Weyer, 505 S. Beverly Dr. #1224, Beverly Hills, Calif. 90212

[21] Appl. No.: 08/810,257

[22] Filed: Mar. 3, 1997

Related U.S. Application Data

[60] Provisional application No. 60/013,266, Mar. 12, 1996.

[51] Int. Cl.[7] .................................................. G09B 5/00
[52] U.S. Cl. ............................................................ 434/169
[58] Field of Search .................................... 434/247, 169, 434/322, 323, 327, 350, 362, 307 R

[56] References Cited

U.S. PATENT DOCUMENTS

| | | | |
|---|---|---|---|
| 4,611,996 | 9/1986 | Stoner ....................................... | 434/327 |
| 4,829,431 | 5/1989 | Ott et al. .................................. | 434/323 |
| 4,891,775 | 1/1990 | McWherter .............................. | 434/169 |
| 5,035,625 | 7/1991 | Munson et al. .......................... | 434/327 |
| 5,256,067 | 10/1993 | Gildea et al. ............................ | 434/327 |
| 5,738,527 | 4/1998 | Lundberg ................................. | 434/323 |
| 5,743,743 | 4/1998 | Ho et al. .................................. | 434/323 |
| 5,820,386 | 10/1998 | Sheppard, II ............................ | 434/362 |

Primary Examiner—Valencia Martin-Wallace
Assistant Examiner—John Paradiso
Attorney, Agent, or Firm—Techcoastlaw.com

[57] ABSTRACT

The present invention consists of means for adding educational enhancements to computer games. One embodiment of the invention consists of a software module that can be incorporated into a game program's code or that can be loaded separately into a computer's memory. This module periodically suspends a game's play by popping up a "flash card" on the computer's display screen asking a question that must be answered correctly before play can be resumed. Questions may be asked at a level that adapts itself to the ability demonstrated by the player. If the player is unable to answer the question within a predetermined period, a hint is flashed on the screen. If the player is still unable to answer the question after a second predetermined period, the answer and an explanation of the answer are displayed on the screen. The player is then be able to resume play by entering the answer. The faster the player is able to enter the correct answer, the faster the player is able to resume play. The module may include security features to prevent it from being deactivated without authorization.

20 Claims, 3 Drawing Sheets

MEANS FOR ADDING EDUCATIONAL ENHANCEMENTS TO COMPUTER GAMES

REFERENCE TO RELATED APPLICATION

This patent application is based on provisional patent application Ser. No. 60/013,266 for "Means for Adding Educational Enhancements to Computer Games" filed Mar. 12, 1996.

FIELD OF THE INVENTION

The present invention relates to computer games, and more particularly to means for providing educational enhancements to computer games.

BACKGROUND OF THE INVENTION

Game and educational software make up large segments of the nonbusiness related software market. Although educational software products attempt to create a game-like environment, educational software products to date have not been as entertaining as pure game software products. Game software, not educational software, is the entertainment software of choice. Students statistically spend more hours playing computer games than doing homework or studying. Parents are interested in promoting the education of their children, and purchase large quantities of educational software that often does not get used. There is a large potential market for a product that adds an educational component to any computer game without interfering with the game's entertainment value. Game producers can expand the market for their games by adding a non-interfering educational component to their products. To date, there has been no educational software product that has approached the entertainment value of popular action game programs.

SUMMARY OF THE INVENTION

The present invention consists of means for adding educational enhancements to computer games. One embodiment of the invention consists of a software module that can be incorporated into a game program's code or that can be loaded separately into a computer's memory. This module periodically suspends a game's play by popping up a "flash card" on the computer's display screen asking a question that must be answered correctly before play can be resumed. Questions may be asked at a level that adapts itself to the ability demonstrated by the player. If the player is unable to answer the question within a predetermined period, a hint is flashed on the screen. If the player is still unable to answer the question after a second predetermined period, the answer and an explanation of the answer are displayed on the screen. The player is then be able to resume play by entering the answer. The faster the player is able to enter the correct answer, the faster the player is able to resume play. The module may include security features to prevent it from being deactivated without authorization.

DETAILED DESCRIPTION OF THE INVENTION

The present invention comprises means for adding educational enhancements to computer games.

Figure 1:
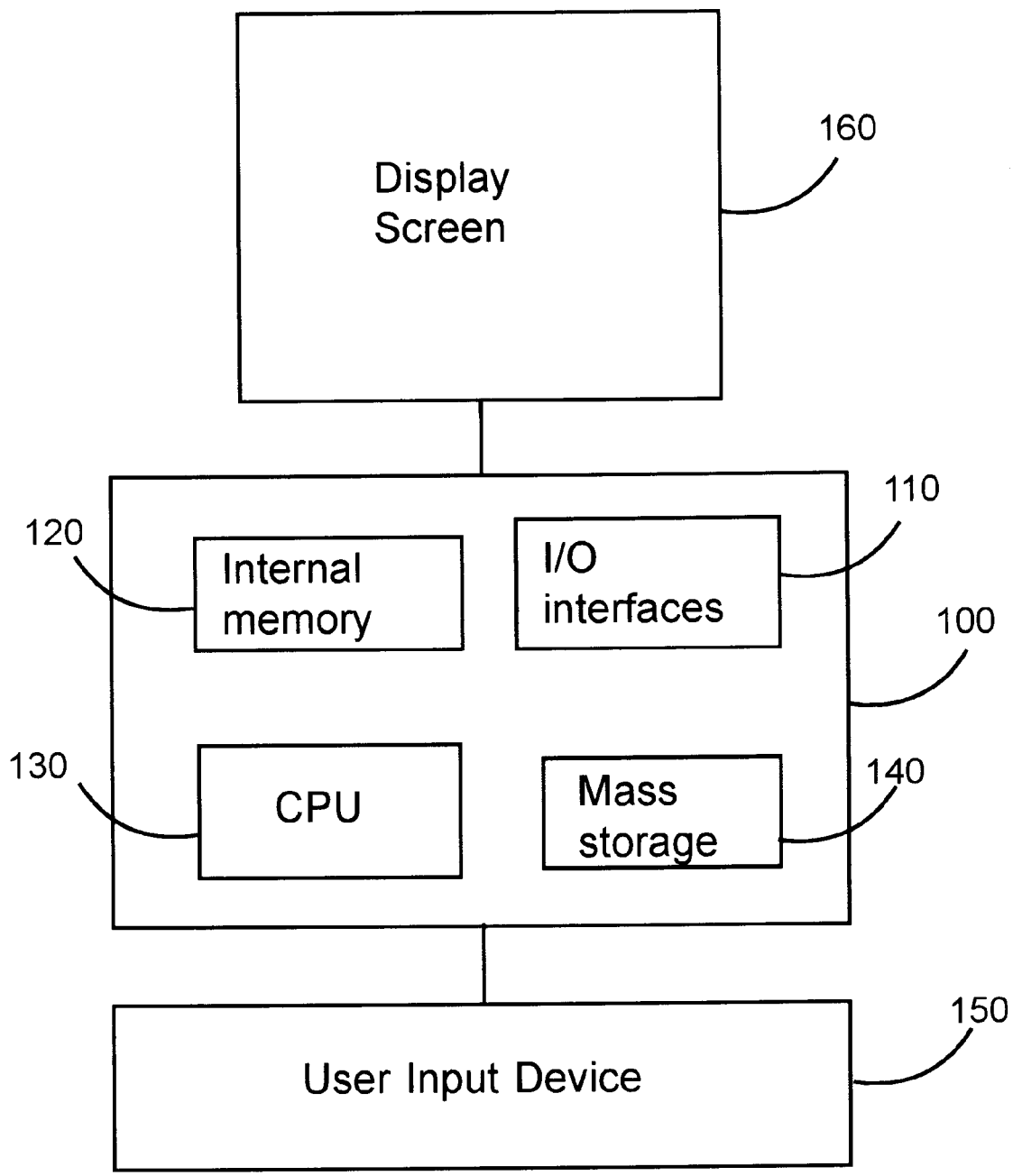
FIG. 1 is a block diagram of a computer system used to play computer games.

FIG. 1 shows a typical computer system used with the present invention. It consists of a main unit 100 that contains a CPU 130, input/output interfaces 110, and internal memory 120, all as are well known in the art. Main unit 100 may also include mass storage 140 such as a hard disk. Main unit 100 is connected to a display screen 160 and a user input device 150. Examples of display screens include LCD and CRT displays. Examples of user input devices include keyboards, joysticks. game pads, and mice. The computer system shown in FIG. 1 may exist in a variety of sizes and configurations. For example, the computer system may be a general purpose computer, or a desktop or hand-held dedicated computer game system. The present invention may be implemented by software running in a computer system such as that shown in FIG. 1.

Figure 2:
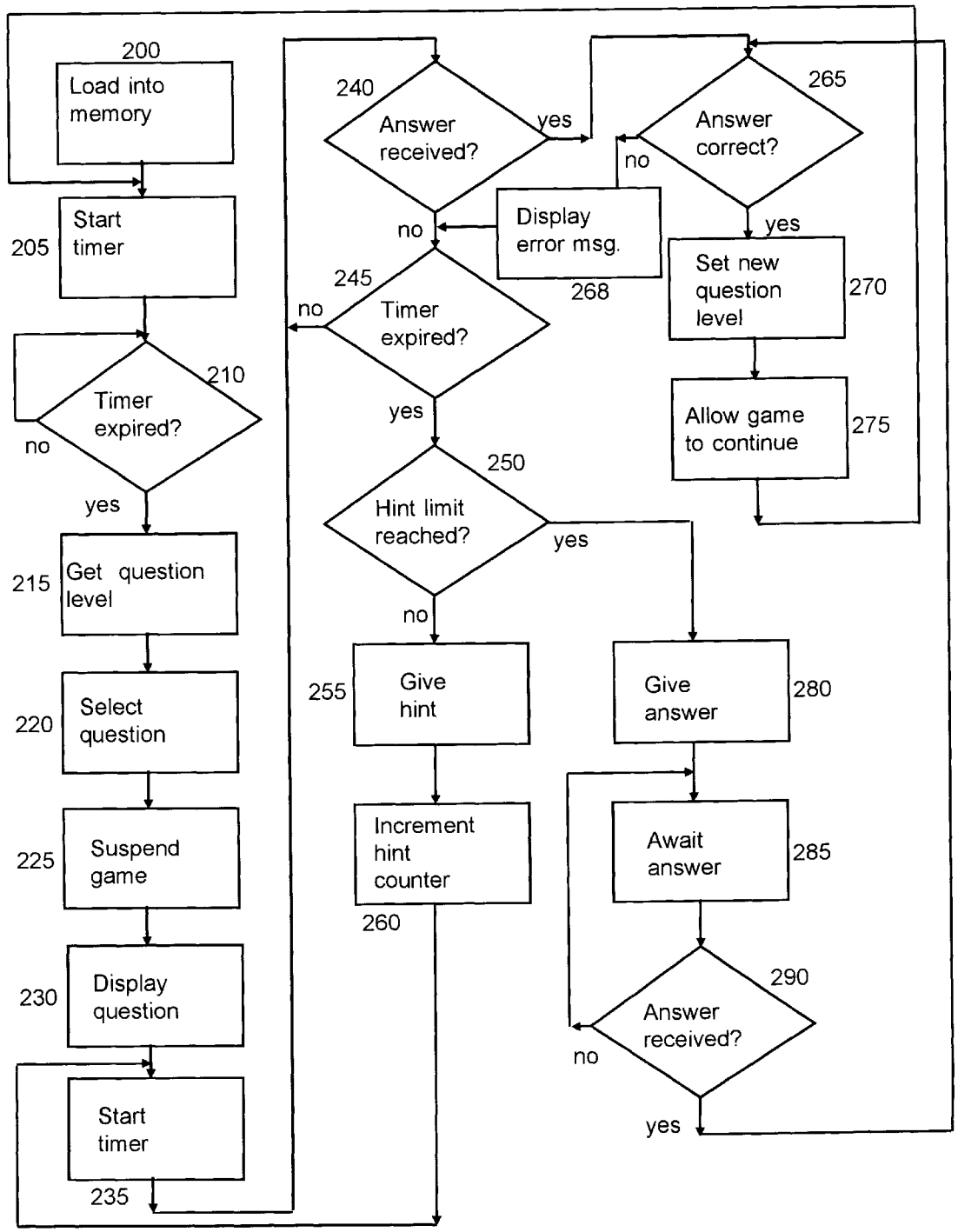
FIG. 2 is a block diagram showing the operation of an embodiment of the present invention.

FIG. 2 is a flow chart showing the operation of one embodiment of the present invention. As shown in FIG. 2, this embodiment begins operation by loading appropriate computer program instructions into memory at block 200. Once the program instructions are loaded into memory, the instructions are executed by the computer in the background, while a computer game program is run in the foreground.

After the computer instructions are loaded into memory at block 200, the operation of the embodiment of FIG. 2 proceeds to block 205 where a first timer is started. This timer controls the time period between questions being presented to the computer user. This time period may be user selectable, or may be hard coded into the program instructions. It may have any length. For example, the period between questions may range between 5 and 30 minutes.

After the timer has started, the embodiment of FIG. 2 checks the timer at block 210 to determine whether the timer has expired, indicating that the end of the applicable timing period has been reached. At this point, the embodiment reads the current question level at block 215. The question level is a relative degree of difficulty of a question. The initial question level may be a default value or may be the last question level left over and stored from a previous operation of the embodiment.

After reading the applicable question level at block 215, a question having the appropriate question level is selected from a question database at block 220. Any of a variety of well known means may be used to select a question of the appropriate level. For example, a random number generator may be used to randomly or pseudo randomly select a question from the available, as yet unasked questions of the appropriate level. The question includes the question itself, the answer, and one or more hints, the purpose of which are outlined below. Once the question has been selected, the embodiment suspends the operation of the computer game that is running in the foreground at block 225 and displays the question, for example on display screen 160 of the computer system shown in FIG. 1, at block 230.

The questions presented by the module may be geared to particular audiences. For example, questions may be aimed at grade school students, high school students, and adults. For example, grade school and high school questions may include questions covering math, languages, history, science, vocabulary, geography, current events and other subjects. Adult questions for example may focus on self improvement topics such as vocabulary building, business topics, and languages. The questions that are presented may consist of text, graphics, sound, video and a combination. The responses required by the player may include text or graphic manipulation using keystrokes, a pointing device such as a mouse, or speech input.

After the game is suspended and the question displayed to the user, a second timer is started at block 235. This timer controls the answer period, which is the time period from the time at which a question is displayed until additional action is taken to help the user correctly answer the question, as described in greater detail below. This time period may, for example, be between 10 and 90 seconds.

After the question has been displayed and the timer starter, the embodiment checks to see if an answer has been received at block 240, and if no answer is received, whether the answering time period has expired at block 245.

If an answer is received before the answering time period has expired, the answer is checked for correctness at block 265. If the answer is correct, a new question level is set at block 270 based on the total time required by the user to answer the question. The faster the question is correctly answered, the higher the new question level.

After the new question level has been set, the game is allowed to continue running at block 275, the first timer is again started at block 205, and the operation of the embodiment continues as described above.

If the answer is incorrect, an error message is displayed to the user at block 268, and operation proceeds to block 245. If the answer timer has not expired, a new answer is awaited at block 240.

If the operation of the embodiment is at block 245 and the answer timer has expired, operation continues on to block 250. At block 250, a check is made to determine whether a predetermined hint limit has been reached. In this embodiment, the hint limit is the number of hints that are given to a user before the correct answer is displayed. The hint limit may range from zero to any desired positive number. For example, the hint limit may be two, meaning that two hints will be given to a user before the correct answer is displayed.

If the hint limit has not been reached, a hint is displayed to the user at block 255. If the hint limit is greater than one, each question will have a number of progressively more complete hints equal in number to the hint limit. The hint displayed at block 255 has a hint level that corresponds to a current value of the hint counter. For example, if the current value of the hint counter is zero (indicating that so far no hints have been given), the most basic hint is given. For higher values of the hint counter, more detailed hints are provided to the user.

After the hint is given at block 255 and the hint counter incremented at block 260, operation returns to block 235, where the answer timer is started anew.

If, on the other hand, it is determined at block 250 that the hint limit has been reached, instead of giving the user another hint at block 255, the answer is displayed to the user at block 280. Then the answer is awaited at block 285. Once it is determined that an answer has been received at block 290, operation returns to block 265, from whence operation continues as described above. It should be noted that in this embodiment, operation of the game does not recommence until the user has actually input the correct answer, for example by using a user input device such as user input device 150 in FIG. 1. This is so even if as here the answer has been displayed to the user at block 280. In this way, the user is forced to consciously consider the answer before game play can be resumed.

Figure 3:
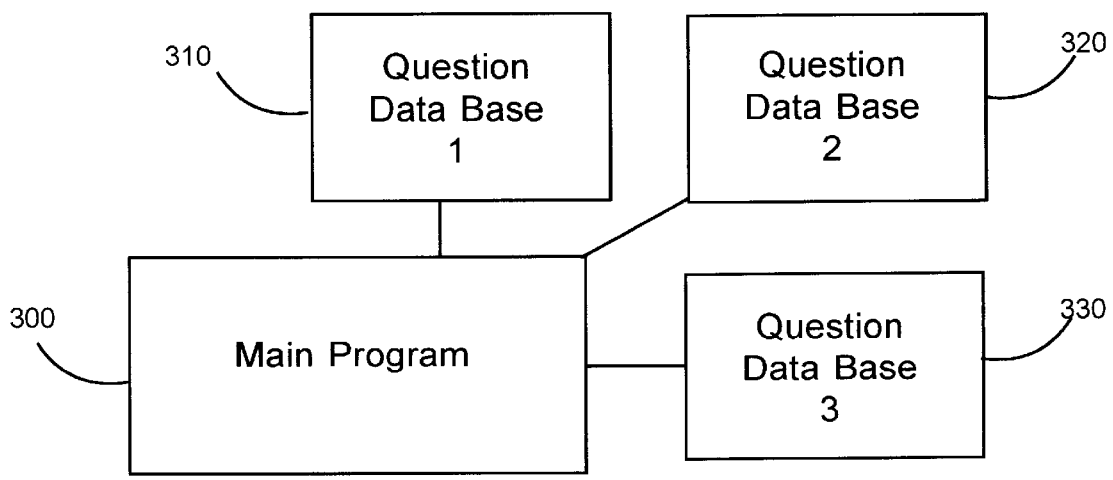
FIG. 3 is a block diagram showing the basic components of an embodiment of the present invention.

FIG. 3 shows the basic block structure of a software program that may be used to implement the present invention. As shown in FIG. 3, the embodiment of FIG. 3 consists of a main program 300 and a first question data base 310.

Main program 300 contains the basic executable code of the embodiment of FIG. 3. Question data base 310 contains the questions, answers, and hints used by main program 300, for example, when carrying out the operations shown in FIG. 2. As shown in FIG. 3, the embodiment may include additional question data bases, such as second and third data bases 320 and 330, respectively.

Software used to implement the present invention may be realized in several embodiments. One embodiment consists of a stand-alone software module for end users that allows a user to add the software module to any existing game program. This embodiment may include security features to prevent the program from being deactivated or uninstalled by anyone other that the person who originally installed to program. A second embodiment consists of an embedded version for game producers that allows them to incorporate the inventive features of the present invention into versions of their game programs. The embodiments incorporated into the OEM games may include additional features, such as giving a player bonus points in the game for quickly answering a question.

Thus a novel means of adding educational enhancements to computer games has been disclosed. The present invention can add an educational enhancement to any existing computer game without interfering with the entertainment value provided by the computer game. As such, it almost effortlessly turns game playing enjoyment into an educational activity. It will be apparent to those skilled in the art that although specific details and embodiments have been presented as examples, other details and embodiments may be used for the present invention, all of which are intended to be encompassed within the scope of this invention.

I claim:

1. A method for providing an educational enhancement to a computer game program, comprising the steps of:

setting a length of a first period of time independently from the operation of said program;

allowing operation of said program to continue for said first period of time;

upon expiration of said first period of time, temporarily suspending operation of said program without regard to a current state of said program;

outputting a first question while said operation of said program is suspended;

awaiting a response to said question;

receiving a response to said question;

resuming operation of said program upon receiving a correct response to said question.

2. The method of claim 1 wherein said step of outputting said first question comprises the step of selecting said question from a database.

3. The method of claim 2 wherein said question is selected from said data based upon a current question level.

4. The method of claim 1 wherein said step of awaiting a response to said question comprises the steps of:

awaiting a response to said question for a second period of time;

outputting information relating to said correct response if no correct response is received prior to expiration of said second period of time.

5. The method of claim 4 wherein said information relating to said correct response comprises a hint.

6. The method of claim 4 wherein said information relating to said correct response comprises said correct response.

7. The method of claim 1 further comprising the step of measuring an amount of time between said outputting of said question and said receiving of said correct response.

8. The method of claim 7 further comprising the steps of:
    allowing operation of said program to continue for a third period of time;
    upon expiration of said third period of time, temporarily suspending operation of said program;
    selecting a second question from a database;
    outputting said second question while operation of said program is suspended.

9. The method of claim 8 wherein said second question is selected based upon said measured amount of time.

10. The method of claim 7 further comprising the step of awarding a bonus score dependent upon said measured amount of time.

11. A program storage device readable by a machine, tangibly embodying a program of instructions executable by the machine to perform a method for providing an educational enhancement to a computer game program, said method comprising the steps of:
    setting a length of a first period of time independently from the operation of said program;
    allowing operation of said program to continue for said first period of time;
    upon expiration of said first period of time, temporarily suspending operation of said program without regard to a current state of said program;
    outputting a first question while said operation of said program is suspended;
    awaiting a response to said question;
    receiving a response to said question;
    resuming operation of said program upon receiving a correct response to said question.

12. The program storage device of claim 11 wherein said step of outputting said first question comprises the step of selecting said question from a database.

13. The program storage device of claim 12 wherein said question is selected from said database based upon a current question level.

14. The program storage device of claim 11 wherein said step of awaiting a response to said question comprises the steps of:
    awaiting a response to said question for a second period of time;
    outputting information relating to said correct response if no correct response is received prior to expiration of said second period of time.

15. The program storage device of claim 14 wherein said information relating to said correct response comprises a hint.

16. The program storage device of claim 14 wherein said information relating to said correct response comprises said correct response.

17. The program storage device of claim 11 wherein said method further comprises the step of measuring an amount of time between said outputting of said question and said receiving of said correct response.

18. The program storage device of claim 17 wherein said method further comprises the steps of:
    allowing operation of said program to continue for a third period of time;
    upon expiration of said third period of time, temporarily suspending operation of said program;
    selecting a second question from a database;
    outputting said second question while operation of said program is suspended.

19. The program storage device of claim 18 wherein said second question is selected based upon said measured amount of time.

20. The program storage device of claim 17 wherein said method further comprises the step of awarding a bonus score dependent upon said measured amount of time.

* * * * *